(12) United States Patent
Abusleme et al.

(10) Patent No.: US 12,195,601 B2
(45) Date of Patent: *Jan. 14, 2025

(54) FLEXIBLE POLYMER ELECTROLYTE

(71) Applicant: SOLVAY SPECIALTY POLYMERS ITALY S.P.A., Bollate (IT)

(72) Inventors: Julio A. Abusleme, Saronno (IT); Maurizio Biso, Milan (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 799 days.

This patent is subject to a terminal disclaimer.

(21) Appl. No.: 17/311,039

(22) PCT Filed: Dec. 19, 2019

(86) PCT No.: PCT/EP2019/086193
§ 371 (c)(1),
(2) Date: Jun. 4, 2021

(87) PCT Pub. No.: WO2020/127653
PCT Pub. Date: Jun. 25, 2020

(65) Prior Publication Data
US 2022/0025139 A1    Jan. 27, 2022

(30) Foreign Application Priority Data

Dec. 21, 2018    (EP) .................................. 18215077

(51) Int. Cl.
| | | |
|---|---|---|
| C08J 5/22 | (2006.01) |
| C08F 214/22 | (2006.01) |
| C08F 214/24 | (2006.01) |
| H01G 11/56 | (2013.01) |
| H01M 10/0525 | (2010.01) |
| H01M 10/0565 | (2010.01) |

(52) U.S. Cl.
CPC ......... *C08J 5/2237* (2013.01); *C08F 214/225* (2013.01); *C08F 214/245* (2013.01); *H01G 11/56* (2013.01); *H01M 10/0525* (2013.01); *H01M 10/0565* (2013.01); *C08J 2327/16* (2013.01); *H01M 2300/0082* (2013.01)

(58) Field of Classification Search
CPC .. C08J 5/2237; C08J 2327/16; C08F 214/225; C08F 214/245
See application file for complete search history.

(56) References Cited

U.S. PATENT DOCUMENTS

| | | | |
|---|---|---|---|
| 4,016,345 A | 4/1977 | Holmes | |
| 4,725,644 A | 2/1988 | Malhotra | |
| 6,479,591 B2 | 11/2002 | Kapeliouchko et al. | |
| 2005/0079406 A1* | 4/2005 | Daido | H01M 50/44 |
| | | | 429/231.95 |
| 2010/0133482 A1* | 6/2010 | Abusleme | B01D 71/76 |
| | | | 252/511 |

FOREIGN PATENT DOCUMENTS

| | | | |
|---|---|---|---|
| WO | 2008129041 A1 | 10/2008 | |
| WO | 2011121078 A1 | 10/2011 | |
| WO | 2013160240 A1 | 10/2013 | |
| WO | WO-2015169834 A1 * | 11/2015 | .......... C08F 214/225 |
| WO | 2017178447 A1 | 10/2017 | |

OTHER PUBLICATIONS

ASTM D3418-08—Standard Test Method for Transition Temperatures and Enthalpies of Fusion and Crystallization of Polymers by Differential Scanning Calorimetry, 2008, 7 pages.

* cited by examiner

*Primary Examiner* — Catherine S Branch
(74) *Attorney, Agent, or Firm* — Osha Bergman Watanabe & Burton LLP

(57) ABSTRACT

The invention pertains to certain fluoropolymer-based hybrid organic/inorganic composites, to polymer electrolytes obtained therefrom and to use of said polymer electrolytes in electrochemical devices.

19 Claims, No Drawings

FLEXIBLE POLYMER ELECTROLYTE

CROSS-REFERENCE TO RELATED APPLICATIONS

This application is a U.S. national stage entry under 35 U.S.C. § 371 of International Application No. PCT/EP2019/086193 filed Dec. 19, 2019, which claims priority to European application No. 18215077.1, filed on Dec. 21, 2018. The entire contents of these applications are explicitly incorporated herein by this reference.

TECHNICAL FIELD

The present invention pertains to certain fluoropolymer-based hybrid organic/inorganic composites, to polymer electrolytes obtained therefrom and to use of said polymer electrolytes in electrochemical devices.

BACKGROUND ART

Hybridization at the nanometer scale organic and inorganic compounds is an important and evolutionary way to create new materials. Organic-inorganic polymer hybrids, wherein organic polymers are dispersed in inorganic solids on a nano or molecular level, have raised a great deal of scientific, technological and industrial interests because of their unique properties.

To elaborate organic-inorganic polymer hybrids, a sol-gel process using metal alkoxides is the most useful and important approach. By properly controlling the reaction conditions of hydrolysis and polycondensation of metal alkoxydes, in particular of alkoxysilanes (e.g. tetramethoxysilane (TMOS) or tetraethoxysilane (TEOS)), in the presence of pre-formed organic polymers, it is possible to obtain hybrids with improved properties compared to the original compounds.

Hybrids made from sol-gel technique starting from fluoropolymers, in particular from vinylidene fluoride polymers (PVDFs) are known in the art.

Fluoropolymer hybrid organic/inorganic composite made from sol-gel technique, in particular those made starting from PVDFs, are particularly suitable for use in the preparation of membranes of secondary batteries.

WO 2013/160240 (S 2012/023) discloses a fluoropolymer film comprising a fluoropolymer hybrid organic/inorganic composite and its use in the preparation of a membrane for electrochemical applications, and more particularly as separators for lithium ion batteries.

In some recent applications such as in flexible batteries the components of said batteries must be bended several times during the life-time in a given structure or device.

For the applications as membranes in metal-ion secondary battery, fluoropolymers hybrid organic/inorganic composite membranes should remain unchanged despite the high temperatures peaks during battery operation; so, high melting point and flexible composites are desired to avoid any damage to those battery components.

Furthermore, a more flexible polymer electrolyte tends to improve the contact with the electrodes avoiding zones of lack of contact between the separator and electrodes and then lowering the resistance of the interface.

Moreover, given the current marked increase of the use of batteries in electrical cars for avoiding the emission of $CO_2$ in the atmosphere in our cities, producing said batteries with greener and sustainable processes is nowadays gaining great importance.

Thus, the need is felt for fluoropolymer hybrid organic/inorganic composites characterized by high thermal stability and high flexibility that are produced in a sustainable way, thus requiring low amount of energy and non-toxic solvents.

SUMMARY OF INVENTION

The Applicant has now surprisingly found that starting from certain novel vinylidene fluoride copolymer it is possible to manufacture hybrid organic/inorganic composites characterized by high thermal resistance and high flexibility that can be prepared by processes that avoid the use of polluting organic solvents.

Therefore, a first object of the present invention is a process for manufacturing a fluoropolymer hybrid organic/inorganic composite comprising inorganic domains, said process comprising the following steps:

(i) providing a mixture of:
  at least one a semi-crystalline vinylidene fluoride (VDF) copolymer [polymer (A)] comprising:
  (a) recurring units derived from vinylidene fluoride (VDF);
  (b) recurring units derived from chlorotrifluoroethylene (CTFE);
  (c) recurring units derived from at least one hydrophilic (meth)acrylic monomer [monomer (MA)] of formula (I):

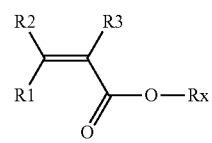

(I)

wherein each of R1, R2, R3, equal or different from each other, is independently an hydrogen atom or a $C_1$-$C_3$ hydrocarbon group, and $R_x$ is a $C_1$-$C_5$ hydrocarbon moiety comprising at least one hydroxyl group; and
  (d) recurring units derived from one or more fluorinated comonomers (F) different from VDF and from CTFE;
  wherein the total amount of recurring units b) is comprised between 6% and 25% by weight with respect to the total weight of recurring units of polymer (A) and the total amount of recurring units d) is comprised between 0.5% and 4% by weight with respect to the total weight of recurring units of polymer (A); and
  at least one compound (M) of formula (II):

$$X_{4-m}AY_m \qquad (II)$$

wherein m is an integer from 1 to 4, A is a metal selected from the group consisting of Si, Ti and Zr, Y is a hydrolysable group, X is a hydrocarbon group, optionally comprising one or more functional groups;

(ii) reacting at least a fraction of hydroxyl groups of the Rx of said monomer (MA) of said polymer (A) with at least a fraction of said compound (M), so as to obtain a grafted polymer comprising pendant —$Y_{m-1}AX_{4-m}$ groups, with m, Y, A and X having same meaning as above detailed;

(iii) hydrolyzing and/or polycondensing compound (M) and/or pendant —$Y_{m-1}AX_{4-m}$ groups, as above detailed to yield a fluoropolymer hybrid organic/inorganic composite comprising inorganic domains.

In a second object, the present invention provides a fluoropolymer hybrid organic/inorganic composite comprising inorganic domains obtainable by the process of the invention.

It has been surprisingly found that when the manufacture of the fluoropolymer hybrid organic/inorganic composite is carried out in the presence of an electrolytic solution comprising a liquid medium and at least one electrolytic salt, a self-standing polymer electrolyte can be obtained, such polymer electrolyte possessing outstanding flexibility properties and having excellent ionic conductivity and thermal stability.

A third object of the invention is thus a polymer electrolyte based on a fluoropolymer hybrid organic/inorganic composite comprising inorganic domains, said polymer electrolyte being obtained by a process comprising:

(I) providing a mixture of:
  at least one a semi-crystalline vinylidene fluoride (VDF) copolymer [polymer (A)] comprising:
    (a) recurring units derived from vinylidene fluoride (VDF);
    (b) recurring units derived from chlorotrifluoroethylene (CTFE);
    (c) recurring units derived from at least one hydrophilic (meth)acrylic monomer [monomer (MA)] of formula (I):

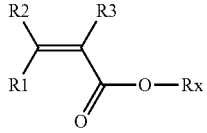

(I)

wherein each of R1, R2, R3, equal or different from each other, is independently an hydrogen atom or a $C_1$-$C_3$ hydrocarbon group, and Rx is a $C_1$-$C_5$ hydrocarbon moiety optionally comprising at least one hydroxyl group; and
    (d) recurring units derived from one or more fluorinated comonomers (F) different from VDF and from CTFE;
  wherein the total amount of recurring units b) is comprised between 6% and 20% by weight with respect to the total weight of recurring units of polymer (A) and the total amount of recurring units d) is comprised between 0.5% and 4% by weight with respect to the total weight of recurring units of polymer (A);
  at least one compound (M) of formula (II):

$$X_{4-m}AY_m \qquad (II)$$

wherein m is an integer from 1 to 4, A is a metal selected from the group consisting of Si, Ti and Zr, Y is a hydrolysable group, X is a hydrocarbon group, optionally comprising one or more functional groups; and
  an electrolyte solution (ES) comprising at least one metal salt [metal salt (MS)] and a liquid medium [medium (L)];

(II) reacting at least a fraction of hydroxyl groups of the Rx groups of said monomer (MA) of said polymer (A) with at least a fraction of said compound (M), so as to obtain a grafted polymer comprising pendant —$Y_{m-1}AX_{4-m}$ groups, with m, Y, A and X having same meaning as above detailed;

(III) hydrolyzing and/or polycondensing compound (M) and/or pendant —$Y_{m-1}AX_{4-m}$ groups, as above detailed to yield a polymer electrolyte based on a fluoropolymer hybrid organic/inorganic composite comprising inorganic domains incorporating the electrolyte solution (ES).

The polymer electrolyte of the present invention can be suitably used for the manufacture of a polymer electrolyte membrane.

In a further object, the present invention thus provides a process for the manufacture of a polymer electrolyte membrane comprising processing the polymer electrolyte as above defined through compression moulding or extrusion techniques.

The polymer (A) as above defined, used in the manufacture of the fluoropolymer hybrid organic/inorganic composite of the present invention is novel, and thus represents another object of the present invention.

The invention further pertains to an electrochemical device comprising the polymer electrolyte membrane as defined above.

DESCRIPTION OF EMBODIMENTS

By the term "recurring unit derived from vinylidene fluoride" (also generally indicated as vinylidene difluoride 1,1-difluoroethylene, VDF), it is intended to denote a recurring unit of formula $CF_2=CH_2$.

The term "semi-crystalline" is intended to denote a vinylidene fluoride (VDF) polymer having a detectable melting point. It is generally understood that a semi-crystalline VDF polymer has a heat of fusion of advantageously at least 0.4 J/g, preferably of at least 0.5 J/g, more preferably of at least 1 J/g, as measured according to ASTM D 3418.

By the term "recurring units derived from chlorotrifluoroethylene" it is intended to denote a recurring unit of formula $CF_2=CFCl$.

Polymer (A) of the present invention has notably an intrinsic viscosity of at most 0.50 l/g, preferably of at most 0.45 l/g, more preferably of at most 0.25 l/g, still more preferably of at most 0.20 l/g.

Polymer (A) of the present invention has notably an intrinsic viscosity of at least 0.05 l/g, preferably of at least 0.08 l/g, more preferably of at least 0.15 l/g, still more preferably of at least 0.10 l/g.

The intrinsic viscosity of polymer (A) is typically measured at 25° C. in N,N-dimethylformamide.

The term "at least one hydrophilic (meth)acrylic monomer (MA)" is understood to mean that the polymer (A) may comprise recurring units derived from one or more than one hydrophilic (meth)acrylic monomer (MA) as above described. In the rest of the text, the expressions "hydrophilic (meth)acrylic monomer (MA)" and "monomer (MA)" are understood, for the purposes of the present invention, both in the plural and the singular, that is to say that they denote both one or more than one hydrophilic (meth)acrylic monomer (MA).

Non-limitative examples of hydrophilic (meth)acrylic monomers (MA) of formula (I) include, notably:
hydroxyethyl(meth)acrylate (HEA),
2-hydroxypropyl acrylate (HPA),
hydroxyethylhexyl(meth)acrylate,
and mixtures thereof.

More preferably, the at least one hydrophilic (meth)acrylic monomer (MA) is hydroxyethylacrylate (HEA).

In a preferred embodiment of the invention, in polymer (A) recurring units deriving from the hydrophilic (meth)

acrylic monomer (MA) of formula (I) are comprised in an amount of from 0.1% to 3% by weight, preferably from 0.3 to 2% by weight, more preferably from 0.4 to 1.5% by weight with respect to the total weight of recurring units of polymer (A).

By the term "fluorinated comonomer (F)", it is hereby intended to denote an ethylenically unsaturated comonomer comprising at least one fluorine atoms.

Non-limitative examples of suitable fluorinated comonomers (F) include, notably, the followings:
  (a) $C_2$-$C_8$ fluoro- and/or perfluoroolefins such as tetrafluoroethylene (TFE), hexafluoropropylene (HFP), pentafluoropropylene and hexafluoroisobutylene;
  (b) $C_2$-$C_8$ hydrogenated monofluoroolefins, such as 1,2-difluoroethylene and trifluoroethylene;
  (c) perfluoroalkylethylenes of formula $CH_2=CH-R_{f0}$, wherein $R_{f0}$ is a $C_1$-$C_6$ perfluoroalkyl group;
  (d) (per)fluoroalkylvinylethers of formula $CF_2=CFOR_{f1}$ wherein $R_{f1}$ is a perfluorinated alkyl group —$CF_3$ (perfluoromethylvinylether (PMVE)), —$C_2F_5$ (perfluoroethylvinylether (PEVE)), —$C_3F_7$ (perfluoropropylvinylether (PPVE)), —$C_4F_9$ or —$C_5F_{11}$ group,
  (e) chloro- and/or bromo- and/or iodo-$C_2$-$C_6$ fluoroolefins.

The fluorinated comonomer (F) is preferably HFP or PMVE.

Recurring units deriving from the fluorinated comonomers (F) are preferably comprised in in polymer (A) in an amount of from 0.7 to 2.0% by weight with respect to the total weight of recurring units of polymer (A).

In a more preferred embodiment of the invention, polymer (A) comprises, preferably consist of:
  from 8 to 20% by weight of recurring units deriving from the CTFE monomer,
  from 0.4 to 1.5% by weight of recurring units deriving from hydrophilic (meth)acrylic monomer (MA) of formula (I),
  from 0.7 to 2.0% by weight of recurring units deriving from comonomers (F),
the percentage by weight being with respect to the total weight of recurring units of polymer (A).

Determination of weight (average mole) percentage of monomer CTFE, monomer (MA), fluorinated comonomer (F) and VDF recurring units in polymer (A) can be performed by any suitable method, NMR being preferred.

In a preferred embodiment of the present invention, polymer (A) is a VDF-CTFE-HEA-HFP tetrapolymer. Preferably, the polymer (A) of said preferred embodiment has an intrinsic viscosity of at least 0.10 l/g, and a second melting temperature ($T_{2f}$) of at least 130° C., preferably of at least 145° C., more preferably of at least 150° C.

The second melting temperature ($T_{2f}$) is typically measured by differential scanning calorimetry (DSC) according to ASTM D 3418 standard method.

The polymer (A) according to the present invention is typically obtainable by polymerization of a VDF monomer, at least one hydrogenated (meth)acrylic monomer (MA), a CTFE monomer and at least one fluorinated comonomer (F), either in suspension, according to the procedures described, for example, in WO 2008/129041, or in emulsion, typically carried out as described in the art (see e.g. U.S. Pat. Nos. 4,016,345, 4,725,644 and 6,479,591).

The polymerization reaction is generally performed at temperatures of between 25° C. and 150° C., at a pressure of up to 130 bar.

Polymer (A) is typically provided in the form of powder.

Polymer (A) may be optionally further extruded to provide polymer (A) in the form of pellets.

The metal compound (M) [compound (M)] of formula $X_{4-m}AY_m$ can comprise one or more functional groups on any of groups X and Y, preferably on at least one group X.

In case compound (M) comprises at least one functional group, it will be designated as functional compound (M); in case none of groups X and Y comprises a functional group, compound (M) will be designated as non-functional compound (M).

Functional compounds (M) can advantageously provide for a fluoropolymer hybrid organic/inorganic composite having functional groups, thus further modifying the chemistry and the properties of the hybrid composite over native polymer (A) and native inorganic phase.

As non limitative examples of functional groups, mention can be made of epoxy group, carboxylic acid group (in its acid, ester, amide, anhydride, salt or halide form), sulphonic group (in its acid, ester, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

To the aim of obtaining polymer electrolyte based on fluoropolymer hybrid organic/inorganic composites having functional groups, it is generally preferred that any of groups X of compound (M) of formula $X_{4-m}AY_m$ comprises one or more functional groups and that m is an integer of 1 to 3, so that advantageously each A atom, after complete hydrolysis and/or polycondensation in step (i) of the process, will nevertheless be bound to a group comprising a functional group.

Preferably, X in compound (M) is selected from $C_1$-$C_{18}$ hydrocarbon groups, optionally comprising one or more functional groups. More preferably, X in compound (M) is a $C_1$-$C_{12}$ hydrocarbon group, optionally comprising one or more functional group.

With the aim of manufacturing a polymer electrolyte based on a fluoropolymer hybrid organic/inorganic composites which can exhibit functional behaviour in terms of hydrophilicity or ionic conductivity, functional group of compound (M) will be preferably selected among carboxylic acid group (in its acid, anhydride, salt or halide form), sulphonic group (in its acid, salt or halide form), phosphoric acid group (in its acid, salt, or halide form), amine group, and quaternary ammonium group; most preferred will be carboxylic acid group (in its acid, anhydride, salt or halide form) and sulphonic group (in its acid, salt or halide form).

The selection of the hydrolysable group Y of the compound (M) is not particularly limited, provided that it enables in appropriate conditions the formation of a —O-A≡ bond; said hydrolysable group can be notably a halogen (especially a chlorine atom), a hydrocarboxy group, a acyloxy group or a hydroxyl group.

Examples of functional compounds (M) are notably vinyltriethoxysilane, vinyltrimethoxysilane, vinyltrismethoxyethoxysilane of formula $CH_2=CHSi(OC_2H_4OCH_3)_3$, 2-(3,4-epoxycyclohexylethyltrimethoxysilane) of formula:

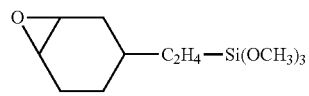

glycidoxypropylmethyldiethoxysilane of formula:

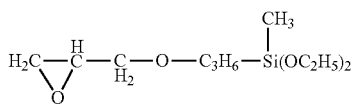

glycidoxypropyltrimethoxysilane of formula:

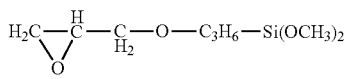

methacryloxypropyltrimethoxysilane of formula:

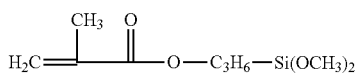

aminoethylaminpropylmethyldimethoxysilane of formula:

aminoethylaminpropyltrimethoxysilane of formula:

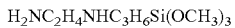

3-aminopropyltriethoxysilane, 3-phenylaminopropyltrimethoxysilane, 3-chloroisobutyltriethoxysilane, 3-chloropropyltrimethoxysilane, 3-mercaptopropyltriethoxysilane, 3-mercaptopropyltrimethoxysilane, n-(3-acryloxy-2-hydroxypropyl)-3-aminopropyltriethoxysilane, (3-acryloxypropyl)dimethylmethoxysilane, (3-acryloxypropyl)methyldichlorosilane, (3-acryloxypropyl)methyldimethoxysilane, 3-(n-allylamino)propyltrimethoxysilane, 2-(4-chlorosulfonylphenyl)ethyltrimethoxysilane, 2-(4-chlorosulphonylphenyl)ethyl trichlorosilane, carboxyethylsilanetriol, and its sodium salts, triethoxysilylpropylmaleamic acid of formula:

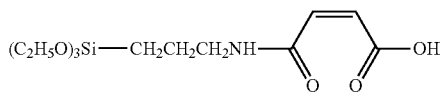

3-(trihydroxysilyl)-1-propane-sulphonic acid of formula $HOSO_2—CH_2CH_2CH_2—Si(OH)_3$, N-(trimethoxysilylpropyl)ethylene-diamine triacetic acid, and its sodium salts, 3-(triethoxysilyl)propylsuccinic anhydride of formula:

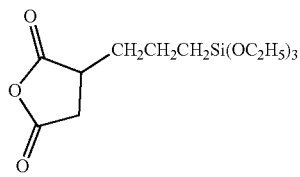

acetamidopropyltrimethoxysilane of formula $H_3C—C(O)NH—CH_2CH_2CH_2—Si(OCH_3)_3$, alkanolamine titanates of formula $Ti(A)_x(OR)_y$, wherein A is an amine-substituted alkoxy group, e.g. $OCH_2CH_2NH_2$, R is an alkyl group, and x and y are integers such that x+y=4.

Examples of non-functional compounds (M) are notably triethoxysilane, trimethoxysilane, tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

Mixtures of one or more functional compounds (M) and one or more non-functional compound (M) can be used in the process of the invention. Otherwise functional compound(s) (M) or non-functional compound(s) (M) can be separately used.

The amount of the compound (M) used in the process of the invention is such that the mixture of step (i) comprises advantageously at least 0.1% by weight, preferably at least 1% by weight, more preferably at least 5% by weight of said compound (M) based on the total weight of the polymer (A) and the compound (M) in said mixture.

The amount of the compound (M) used in the process of the invention is such that the mixture of step (i) comprises advantageously at most 95% by weight, preferably at most 75% by weight, more preferably at most 55% by weight of said compound (M) based on the total weight of the polymer (A) and the compound (M) in said mixture.

The polymer (A) comprising recurring units derived from at least one monomer (MA) having formula (I) as defined above and the compound (M) can be notably reacted in molten phase.

Melt compounders such as extruders, melt kneaders or other devices can be advantageously used to this aim.

The polymer (A) and the compound (M) can be also notably reacted in liquid phase. Should they be reacted in liquid phase, the mixture of step (i) of the process of the invention may comprise at least one organic solvent (S).

The choice of the organic solvent (S) is not particularly limited provided that it is suitable for solubilising the polymer (A) of the invention at a temperature lower than 30° C.

The organic solvent (S) is typically selected from the group consisting of ketones, including lower ketones such as acetone, methylethylketone and higher ketones, such as isophorone, methyl isobutyl ketone (MIK), cyclohexanone, diisobutyl ketone; amides such as N,N-dimethylformamide (DMF), N,N-dimethylacetamide, tetramethyl urea; polar aprotic solvents comprising oxygen and/or nitrogen heteroatom(s), such as dimethylsulfoxide (DMSO), tetrahydrofuran (THF), N-methyl-2-pyrrolidone (NMP); organic phosphates such as trimethyl phosphate, triethyl phosphate and mixtures thereof.

The choice of non-toxic solvents in the preparation of polymer compositions is particularly suitable for use in the manufacture of components of secondary batteries such as those for portable devices or for electric cars, which is nowadays a market in constant increase.

Avoiding the use of toxic and polluting solvents in the preparation of components for secondary batteries allows eliminating cost and avoiding safety and environmental concerns related to handling of large volume of said solvents.

According to a preferred embodiment of the present invention, the organic solvent (S) is thus a non-toxic solvent, preferably is a ketone.

Very good results have been obtained when the ketone is a linear aliphatic ketone having a standard boiling point lower than 120° C., preferably lower than 100° C., more preferably lower than 70° C., preferably acetone.

When polymer (A) and metal compound (M) are reacted in liquid phase, mixing can be accomplished at room temperature (about 25° C.) or upon heating.

According to an embodiment of the invention, the mixture of step (i) of the process of the invention can further comprise at least one inorganic filler (I).

The addition of such inorganic filler (I) will enable advantageously obtaining fluoropolymer films having improved mechanical properties.

The inorganic filler (I) is generally provided in the mixture under the form of particles.

The inorganic filler (I) particles generally have an average particles size of 0.001 µm to 1000 µm, preferably of 0.01 µm to 800 µm, more preferably of 0.03 µm to 500 µm.

The choice of the inorganic filler (I) is not particularly limited; nevertheless, inorganic fillers having on their surface reactive groups towards compound (M) are generally preferred.

Among surface reactive groups, mention can be notably made of hydroxyl groups.

Without being bound by this theory, the Applicant believes that reaction between at least a fraction of compound (M) with at least a fraction of said surface reactive group of the inorganic filler (I) can occur simultaneously with the reaction of at least a fraction of compound (M) with at least a fraction of the hydroxyl groups of Rx of the monomer (MA), so that in subsequent hydrolysis and/or polycondensation step, chemical bonding between the polymer (A) and the inorganic filler is likely achieved through the inorganic domains derived from compound (M).

Among inorganic fillers (I) suitable for being used in the process of the invention, mention can be made of inorganic oxides, including mixed oxides, metal sulphates, metal carbonates, metal sulfides and the like.

Among metal oxides, mention can be made of $SiO_2$, $TiO_2$, ZnO, $Al_2O_3$.

A class of compounds which gave particularly good results within the context of this embodiment of the present invention are notably silicates, aluminium-silicates and magnesium silicates, all optionally containing additional metals such as sodium, potassium, iron or lithium.

These silicates, aluminium-silicates and magnesium silicates are generally known as possessing a layered structure.

These silicates, aluminium-silicates and magnesium silicates, all optionally containing additional metals such as sodium, potassium, iron or lithium can be notably smectic clays, possibly of natural origin, such as notably montmorillonites, sauconite, vermiculite, hectorite, saponite, nontronite. As an alternative, silicates, aluminium-silicates and magnesium silicates, all optionally containing additional metals such as sodium, potassium, iron or lithium can be selected among synthetic clays, like notably fluorohectorite, hectorite, laponite.

The hydrolysis and/or polycondensation of step (iii) of the process of the invention can be carried out simultaneously to the step (ii) of reacting hydroxyl groups of polymer (A) and hydrolysable group(s) (Y) of compound (M) or can be carried out once said reaction has occurred.

Typically, in particular for compounds wherein A is Si, this hydrolysis and/or polycondensation is initiated by addition of at least one appropriate catalyst and/or reactant. Generally, water or a mixture of water and an acid can be used for promoting this reaction.

The choice of the acid is not particularly limited; both organic and inorganic acids can be used. Formic acid is among the preferred acids which can be used in the process of the invention.

Generally, the addition of an aqueous medium preferably comprising an acid will be the preferred method for promoting the hydrolysis and/or polycondensation.

While this hydrolysis and/or polycondensation can take place at room temperature (25° C.), it is generally preferred to carry out this step upon heating at a temperature exceeding 50° C.

Actual temperatures will be selected having regards to the boiling point and/or stability of the organic solvent (S), if any. Generally, temperatures between 20° C. and 150° C., preferably between 40° C. and 120° C. will be preferred.

It is understood that in step (iii) of the process of the invention hydrolysable group(s) Y of the compound (M) and, optionally, of pendant groups of formula $—Y_{m-1}AX_{4-m}$ as defined above will react so as to yield a hybrid composite comprising polymer domains consisting of chains of polymer (A) and inorganic domains consisting of residues derived from compound (M).

As this will be recognized by the skilled in the art, the hydrolysis and/or polycondensation reaction generally generate low molecular weight side products, which can be notably water or alcohol, as a function of the nature of the metal compound (M).

According to a second object of the invention, a polymer electrolyte based on a fluoropolymer hybrid organic/inorganic composite as above defined is provided.

The polymer electrolyte of the present invention comprises the electrolyte solution (ES) incorporated in to the sol-gel matrices of the fluoropolymer hybrid organic/inorganic composite. The fluoropolymer hybrid organic/inorganic composite has in fact the ability to retain the electrolyte solution, which becomes incorporated into the sol-gel matrices providing a self-standing polymer electrolyte.

The electrolyte solution (ES) comprises at least one metal salt [metal salt (MS)] and a liquid medium [medium (L)].

By the term "metal salt (MS)", it is hereby intended to denote a metal salt comprising electrically conductive ions.

A variety of metal salts may be employed as metal salts (MS). Metal salts which are stable and soluble in the chosen liquid medium (L) are generally used.

Non-limitative examples of suitable metal salts (MS) include, notably, MeI, $Me(PF_6)_n$, $Me(BF_4)_n$, $Me(ClO_4)_n$, $Me(bis(oxalato)borate)_n$ ("$Me(BOB)_n$"), $MeCF_3SO_3$, $Me[N(CF_3SO_2)_2]_n$, $Me[N(C_2F_5SO_2)_2]_n$, $Me[N(CF_3SO_2)(R_FSO_2)]_n$ with RF being $C_2F_5$, $C_4F_9$, $CF_3OCF_2CF_2$, $Me(AsF_6)_n$, $Me[C(CF_3SO_2)_3]_n$, $Me_2S_n$, wherein Me is a metal, preferably a transition metal, an alkaline metal or an alkaline-earth metal, more preferably Me being Li, Na, K, Cs, and n is the valence of said metal, typically n being 1 or 2.

Preferred metal salts (MS) are selected from the followings: LiI, $LiPF_6$, $LiBF_4$, $LiClO_4$, lithium bis(oxalato)borate ("LiBOB"), $LiCF_3SO_3$, $LiN(OF_3SO_2)_2$ ("LiTFSI"), $LiN(O_2F_5SO_2)_2$, $M[N(CF_3SO_2)(R_FSO_2)]_n$ with $R_F$ being $C_2F_5$, $C_4F_9$, $CF_3OCF_2CF_2$, $LiAsF_6$, $LiC(CF_3SO_2)_3$, $Li_2S_n$ and combinations thereof.

The liquid medium can suitably be selected from ionic liquids (IL), organic carbonates or mixture thereof.

By the term "ionic liquid (IL)", it is hereby intended to denote a compound formed by the combination of positively charged cations and negatively charged anions which exists in the liquid state at temperatures below 100° C. under atmospheric pressure.

The ionic liquid (IL) can be selected from protic ionic liquids ($IL_p$), aprotic ionic liquids ($IL_a$) and mixtures thereof.

By the term "protic ionic liquid ($IL_p$)", it is hereby intended to denote an ionic liquid wherein the cation comprises one or more $H^+$ hydrogen ions.

Non-limitative examples of cations comprising one or more $H^+$ hydrogen ions include, notably, imidazolium, pyridinium, pyrrolidinium or piperidinium rings, wherein the nitrogen atom carrying the positive charge is bound to a $H^+$ hydrogen ion.

By the term "aprotic ionic liquid ($IL_a$)", it is hereby intended to denote an ionic liquid wherein the cation is free of $H^+$ hydrogen ions.

The ionic liquid (IL) is typically selected from those comprising as cation a sulfonium ion or an imidazolium, pyridinium, pyrrolidinium or piperidinium ring, said ring being optionally substituted on the nitrogen atom, in particular by one or more alkyl groups with 1 to 8 carbon atoms, and on the carbon atoms, in particular by one or more alkyl groups with 1 to 30 carbon atoms.

Within the meaning of the present invention, by the term "alkyl group" it is meant saturated hydrocarbon chains or those carrying one or more double bonds and containing 1 to 30 carbon atoms, advantageously 1 to 18 carbon atoms and even more advantageously 1 to 8 carbon atoms. There can be mentioned by way of example the methyl, ethyl, propyl, iso-propyl, n-butyl, isobutyl, sec-butyl, t-butyl, pentyl, isopentyl, 2,2-dimethyl-propyl, hexyl, 2,3-dimethyl-2-butyl, heptyl, 2,2-dimethyl-3-pentyl, 2-methyl-2-hexyl, octyl, 4-methyl-3-heptyl, nonyl, decyl, undecyl and dodecyl groups.

In an advantageous embodiment of the present invention, the cation of the ionic liquid (IL) is selected from the followings:

a pyrrolidinium ring of formula (III) here below:

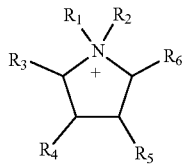

(III)

wherein $R_1$ and $R_2$ each represent independently an alkyl group with 1 to 8 carbon atoms and $R_3$, $R_4$, $R_5$ and $R_6$ each represent independently a hydrogen atom or an alkyl group with 1 to 30 carbon atoms, advantageously 1 to 18 carbon atoms, also more advantageously 1 to 8 carbon atoms, and a piperidinium ring of formula (IV) here below:

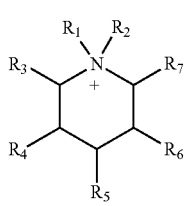

(IV)

wherein $R_1$ and $R_2$ each represent independently of each other an alkyl group with 1 to 8 carbon atoms and $R_3$ to $R_7$ each represent independently of each other a hydrogen atom or an alkyl group with 1 to 30 carbon atoms, advantageously 1 to 18 carbon atoms, even more advantageously 1 to 8 carbon atoms.

In a particularly advantageous embodiment of the present invention, the cation of the ionic liquid (IL) is selected from the followings:

(III-a)

(IV-a)

The ionic liquid (IL) is advantageously selected from those comprising as anion those chosen from halides anions, perfluorinated anions and borates.

The halide anions are in particular selected from the following anions: chloride, bromide, fluoride or iodide.

In a particularly advantageous embodiment of the present invention, the anion of the ionic liquid (IL) is selected from the followings:
bis(trifluoromethylsulphonyl)imide of formula $(SO_2CF_3)_2N^-$,
hexafluorophosphate of formula $PF_6^-$,
tetrafluoroborate of formula $BF_4^-$, and
oxaloborate of formula:

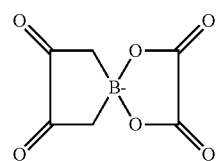 [SMILES: O=C1C[B-]2(CC1=O)OC(=O)C(=O)O2]

The amount of one or more ionic liquids (IL) in the liquid medium used in the process of the invention is such that the mixture of step (i) comprises advantageously at least 1% by weight, preferably at least 5% by weight, more preferably at least 10% by weight of ionic liquids (IL) based on the total weight of the polymer (A) and the ionic liquid (IL) in said mixture.

The amount of one or more ionic liquids (IL) in the liquid medium used in the process of the invention is such that the mixture of step (i) comprises advantageously at most 95% by weight, preferably at most 85% by weight, more preferably at most 75% by weight of ionic liquids (IL) based on the total weight of the polymer (A) and the ionic liquid (IL) in said mixture.

Suitable organic carbonates are ethylene carbonate, propylene carbonate, dimethyl carbonate, diethyl carbonate, ethyl-methyl carbonate, butylene carbonate, vinylene carbonate, fluoroethylene carbonate, fluoropropylene carbonate; and mixtures thereof.

The medium (L) in the electrolyte solution (ES) may further comprise at least one additive [additive (A)].

Should one or more additives (A) be present in the liquid medium, non-limitative examples of suitable additives (A) include, notably, those which are soluble in the medium (L).

The additive (A) is preferably selected from the group consisting of organic carbonates such as ethylene carbonate, propylene carbonate, mixtures of ethylene carbonate and propylene carbonate, dimethyl carbonate, diethyl carbonate, ethyl-methyl carbonate, butylene carbonate, vinylene carbonate, fluoroethylene carbonate, fluoropropylene carbonate and mixtures thereof.

The amount of one or more additives (A), if any, in the liquid medium is typically comprised between 0.1% and 95% by weight, preferably between 1.0% and 70% by weight, more preferably between 5.0% and 50% by weight, based on the total weight of the liquid medium.

The polymer electrolyte of the present invention can be processed into a film to provide a polymer electrolyte membrane for use as separator in electrochemical devices, metal-ion secondary battery in particular.

In a further object, the present invention pertains to a process for the manufacture of a membrane comprising processing the polymer electrolyte of the invention through compression moulding or extrusion techniques.

A further object of the present invention is thus a polymer electrolyte membrane which can be obtained by the process as defined above.

The membranes so obtained typically have a thickness comprised between 5 μm and 100 μm, preferably between 10 μm and 30 μm.

The polymer electrolyte membrane of the invention can be advantageously used as polymer electrolyte separator in electrochemical and photo-electrochemical devices.

Non-limitative examples of suitable electrochemical devices include, notably, secondary batteries, especially Lithium-ion batteries and Lithium-sulfur batteries, and capacitors, especially Lithium-ion capacitors.

The invention further pertains to a metal-ion secondary battery comprising as polymer electrolyte separator the polymer electrolyte membrane of the present invention as defined above.

The metal-ion secondary battery is generally formed by assembling a negative electrode (anode), the polymer electrolyte membrane of the present invention as defined above and a positive electrode (cathode).

The metal-ion secondary battery is preferably an alkaline or alkaline-earth secondary battery, more preferably a Lithium-ion secondary battery.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

EXPERIMENTAL PART

Raw Materials

Tetraethylorthosilicate (TEOS) commercially available as liquid from Aldrich Chemistry purity >99%.

Lithium bis(trifluoromethanesulfonyl)imide (LiTFSI).

Ionic Liquid (IL): N-Propyl-N-methylpyrrolidinium bis(trifluoromethanesulfonyl)imide (Pyr13TFSI) of formula:

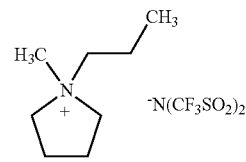

ES: 0.5 M LiTFSI in Pyr13TFSI.

Flexibility

Flexibility of films was evaluated according to ASTM D 790-10 Standard Test Method for Flexural Properties of Unreinforced and Reinforced Plastics and Electrical Insulating Materials at the following operative conditions:

Temperature: 24.2° C.; Humidity: 32.5%; speed: 1.5 mm/min.

The results are shown in terms of elastic modulus (MPa). The lower the value the more flexible is the polymer electrolyte.

Measurement of the Ionic Conductivity (σ)

The polymer electrolyte membrane is placed in a 18 mm stainless steel EL-CELL prototype. The resistance of the polymer electrolyte membrane was measured at 25° C. and the ionic conductivity (σ) was obtained using the following equation:

$$\sigma = \frac{d}{(R_b \times S)}$$

wherein d is the thickness of the film, Rb the bulk resistance and S is the area of the stainless steel electrode.

Determination of Intrinsic Viscosity of Polymer (A)

Intrinsic viscosity (η) [dl/g] was measured using the following equation on the basis of dropping time, at 25° C., of a solution obtained by dissolving polymer (A) in N,N-dimethylformamide at a concentration of about 0.2 g/dl using a Ubbelhode viscosimeter:

$$[\eta] = \frac{\eta_{sp} + \Gamma \cdot \ln \eta_r}{(1 + \Gamma) \cdot c}$$

where c is polymer concentration [g/dl], $\eta_r$ is the relative viscosity, i.e. the ratio between the dropping time of sample solution and the dropping time of solvent, $\eta_{sp}$ is the specific viscosity, i.e. $\eta_r-1$, and r is an experimental factor, which for polymer (A) corresponds to 3.

Example 1: Preparation of VDF Copolymers (Polymers A1, A2 and Comparative Polymers 1, 2, 3 and 4)

In a 4 liters reactor equipped with an impeller running at a speed of 650 rpm were introduced in sequence, demineralised water 2850 g and 0.6 g of Alkox® E-45 and 0.2 g of Methocell® K100 as suspending agent/kg Mni (initial amount of monomers fed to the reactor before the reaction. The reactor was purged with sequence of vacuum (30 mmHg) and purged of nitrogen at 20° C. Then, a 75% by weight solution of t-amyl-perpivalate in isododecane (TAPPI) was added; diethylcarbonate (DEC), the initial amount of HEA, HFP, CTFE (and then about 1200 g of VDF were introduced into the reactor. The amounts of monomers and temperature conditions are specified in Table 1.

The reactor was gradually heated until a set-point temperature at 57° C. and the pressure was fixed at 120 bar. The pressure was kept constantly equal to 120 bar by feeding during the polymerization, the hydroxyethyl acrylate aqueous solution as shown in Table 1. After this feeding, no more aqueous solution was introduced and the pressure started to decrease. The polymerization was stopped by degassing the reactor until reaching atmospheric pressure. A conversion of VDF of about 80% was reached. The CTFE and HEA were substantially all consumed and about half of the HFP remained non-reacted. The polymer so obtained was then recovered, washed with demineralised water and dried at 65° C. overnight.

TABLE 1

| Polymer | Initial CTFE w % | Initial HFP w % | Initial HEA w % | TAPPI (g/kgMnT) | DEC (g/kgMnT) | HEA initial (g) ([HEA] in water solution, g) |
|---|---|---|---|---|---|---|
| Polymer 1 comp | 14 | 0 | 0 | 3 | 41.7 | — |
| Polymer 2 comp | 5 | 2 | 0.8 | 6 | 0 | 0.51 (5.76) |
| Polymer 3 comp | 14 | 0 | 0.8 | 6 | 0 | 0.51 (5.76) |
| Polymer 4 comp | 14 | 2 | 0 | 3.5 | 18 | — |
| Polymer A1 | 14 | 2 | 0.8 | 6 | 0 | 0.51 (5.76) |
| Polymer A2 | 9.5 | 2 | 0.8 | 6 | 0 | 0.51 (5.76) |

MnT is the Total amount of monomers fed to the reactor.

Example 2: Solubility Test

8% by weight compositions in acetone of each comparative polymer 1 to 4 and of polymer A1 and polymer A2 were prepared. A clear and limpid solution at room temperature implies solubility at 25° C. of the polymer in acetone.

The compositions were tested also at 50° C. for evaluating solubility. The results are summarized in Table 2.

TABLE 2

| Polymer | CTFE wt % | HFP wt % | (MA) wt % | $T_{2f}$ (° C.) | Viscosity (g/l) | Solubility at 25° C. | Solubility 50° C. |
|---|---|---|---|---|---|---|---|
| Polymer 1 comp | 14 | 0 | HEA 0 | 168.6 | / | NO | YES |
| Polymer 2 comp | 5 | 0.8 | HEA 0.8 | 158.1 | 0.109 | NO | YES |
| Polymer 3 comp | 14 | 0 | HEA 0.8 | 160.5 | 0.118 | NO | NO |
| Polymer 4 comp | 14 | 0.8 | 0 | 158.1 | 0.167 | NO | YES |
| Polymer A1 | 14 | 0.8 | HEA 0.8 | 155.3 | 0.115 | YES | YES |
| Polymer A2 | 9.5 | 0.8 | HEA 0.8 | 156.9 | 0.105 | YES | YES |

The results show that the polymers according to the invention, thanks to the concomitant presence of certain amounts of recurring units derived from CTFE, MA and of recurring units derived from HFP are soluble in acetone at room temperature. The same is not true for polymers having only recurrent units derived from CTFE and one of monomer MA or HFP or for polymers having a different amount of CTFE monomer.

Example 3: Preparation of Polymer 5: VDF/HEA (0.8% by Weight)/HFP (5% by Weight) Copolymer Having an Intrinsic Viscosity of 0.111/g in DMF at 25° C.

In a 80 liters reactor equipped with an impeller running at a speed of 250 rpm were introduced in sequence 50.2 kg of demineralised water and 3.80 g of METHOCEL® K100 GR and 15.21 g of Alkox® E45 as a couple of suspending agent. The reactor was purged with several sequences of vacuum (30 mmHg) and purged of nitrogen at 20° C. Then 187.3 g of a 75% by weight solution of t-amyl perpivalate initiator in isododecane. The speed of the stirring was increased at 300 rpm. Finally, 16.3 g of hydroxyethylacrylate (HEA) and 2555 g of hexafluoropropylene (HFP) monomers were introduced in the reactor, followed by 22.8 kg of vinylidene fluoride (VDF) were introduced in the reactor. The reactor was gradually heated until a set-point temperature at 55° C. and the pressure was fixed at 120 bar. The pressure was kept constantly equal to 120 bars by feeding 16.96 kg of aqueous solution containing a 188 g of HEA during the polymerization. After this feeding, no more aqueous solution was introduced and the pressure started to decrease. Then, the polymerization was stopped by degassing the reactor until reaching atmospheric pressure. A conversion around 81% of comonomers was obtained. The polymer so obtained was then recovered, washed with demineralised water and oven-dried at 65° C.

Example 4: Preparation of Polymer Electrolyte Using Polymer A1

Polymer A1 (4.14 g) was dissolved in acetone (23.46 g) (15% by weight), in a flask equipped with a cooler, heating 30 minutes at 60° C. ES (5 g) and TEOS (0.35 g) were added to the solution and stirred during 10 minutes at 40° C. A mixture was obtained containing 39% by volume (45% by weight) of polymer A1, 60% by volume (54% by weight) of the electrolyte solution and 1.2% by volume (1.09% by weight) of SiO, (equivalent amount of TEOS fully condensated).

0.154 g of formic acid were then added to the mixture and the mixture was stirred for 2 minutes at 35° C.

The mixture was casted on a Halar® film support using a doctor blade, with a blade opening set at 650 µm. A film of the solution of about 650 µm was obtained. The membrane was dried for 15 minutes at RT, then for 40 minutes at 50° C. in a ventilated oven. Then a thermal post-processing with a temperature ramp up to 150° C. lasting 25 minutes was carried out and then the film was removed from the support. A polymer electrolyte film having a thickness of 74-78 µm was obtained, said film having ionic conductivity and flexibility as shown in Table 3.

Example 5: Preparation of the Polymer Electrolyte Using Polymer A2

Polymer A2 (4.97 g) was dissolved in acetone (19.87 g) (20% by weight), in a flask equipped with a cooler, heating 30 minutes at 60° C. ES (6 g) and TEOS (0.419 g) were added to the solution and stirred for 10 minutes at 40° C. A mixture was obtained containing 39% by volume (45% by weight) of polymer A2, 60% by volume (54% by weight) of the electrolyte solution and 1.2% by volume (1.09% by weight) of SiO, (equivalent amount of TEOS fully condensated).

0.185 g of formic acid were then added to the mixture and the mixture was stirred for 2 minutes at 35° C.

The mixture was casted on a Halar® film support using a doctor blade, with a blade opening set at 650 µm. A film of the solution having a thickness of about 650 µm was obtained. The membrane was dried for 15 minutes at RT, then for 40 minutes at 50° C. in a ventilated oven. Then a thermal post-processing with a temperature ramp up to 150° C. lasting 25 minutes was carried out and then the film was removed from the support. A polymer electrolyte film having a thickness of 74 µm was obtained, said film having ionic conductivity and flexibility as shown in Table 3.

Example 6 Comp: Preparation of the Polymer Electrolyte Using Polymer 5

Polymer 5 (8 g) was dissolved in DMF (32 g) (20% by weight), in a flask equipped with a cooler, heating 30 minutes at 60° C. ES (8 g) and TEOS (0.56 g) were added to the solution and stirred for 10 minutes at 40° C. A mixture was obtained containing 39% by volume (45% by weight) of polymer 5, 60% by volume (54% by weight) of the electrolyte solution and 1.2% by volume (1.09% by weight) of SiO, (equivalent amount of TEOS fully condensated).

0.247 g of formic acid were then added to the mixture and the mixture was stirred for 2 minutes at 35° C.

The mixture was casted on a Halar® film support using a doctor blade, with a blade opening set at 650 µm. A film of the solution having a thickness of about 650 µm was obtained. The membrane was dried for 15 minutes at RT, then for 40 minutes at 50° C. in a ventilated oven. Then a thermal post-processing with a temperature ramp up to 150° C. lasting 25 minutes was carried out and the film was removed from the support. A polymer electrolyte film having a thickness of 77 µm was obtained, said film having ionic conductivity and flexibility as shown in Table 3.

TABLE 3

| Starting polymer | Ionic conductivity S/cm | Flexibility Modulus (MPa) |
|---|---|---|
| Polymer A1 | 6.5E−05 | 11.2 |
| Polymer A2 | 1.2E−04 | 19.1 |
| Polymer 5 | 2.0E−04 | 65.0 |

The data in Table 3 show that the polymer electrolyte films of the present invention are more flexible than the standard polymer electrolytes of the prior art.

The invention claimed is:

1. A semi-crystalline vinylidene fluoride (VDF) copolymer [polymer (A)] comprising:
   (a) recurring units derived from vinylidene fluoride (VDF);
   (b) recurring units derived from chlorotrifluoroethylene (CTFE);
   (c) recurring units derived from at least one hydrophilic (meth) acrylic monomer [monomer (MA)] of formula (I):

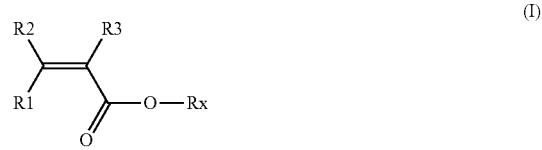

wherein each of R1, R2, R3, equal or different from each other, is independently an hydrogen atom or a $C_1$-$C_3$ hydrocarbon group, and $R_x$ is a $C_1$-$C_5$ hydrocarbon moiety comprising at least one hydroxyl group; and
   (d) recurring units derived from one or more fluorinated comonomers (F) different from VDF and from CTFE;
   wherein the total amount of recurring units b) is comprised between 6% and 25% by weight with respect to the total weight of recurring units of polymer (A) and the total amount of recurring units d) is comprised between 0.5% and 4% by weight with respect to the total weight of recurring units of polymer (A), and
   wherein polymer (A) has a heat of fusion of at least 0.4 J/g, as measured according to ASTMD 3418.

2. The polymer (A) according to claim 1 wherein the monomer (MA) is selected from the group consisting of:
   hydroxyethyl(meth) acrylate (HEA),
   2-hydroxypropyl acrylate (HP A),
   hydroxyethylhexyl(meth) acrylate,
   and mixtures thereof.

3. The polymer (A) according claim 1 that comprises:
   from 8 to 20% by weight of recurring units deriving from the CTFE monomer,
   from 0.4 to 1.5% by weight of recurring units deriving from hydrophilic (meth) acrylic monomer (MA) of formula (I),
   from 0.7 to 2.0% by weight of recurring units deriving from comonomers (F), the percentage by weight being with respect to the total weight of recurring units of polymer (A).

4. The polymer (A) according claim 1 wherein the fluorinated comonomers (F) is selected from the group consisting of:
(a) $C_2$-$C_8$ fluoro- and/or perfluoroolefins;
(b) $C_2$-$C_8$ hydrogenated monofluoroolefins;
(c) perfluoroalkylethylenes of formula $CH_2=CH—R_{f0}$, wherein $R_{f0}$ is a $C_1$-$C_6$ perfluoroalkyl group;
(d) (per) fluoroalkylvinylethers of formula $CF_2=CFOR_{f1}$ wherein $R_{f1}$ is a perfluorinated alkyl group —$CF_3$ (perfluoromethylvinylether (PMVE)), —$C_2F_5$ (perfluoroethylvinylether (PEVE)), —$C_3F_7$ (perfluoropropylvinylether (PPVE)), —$C_4F_9$ or —$C_5F_{11}$ group,
(e) chloro- and/or bromo- and/or iodo-$C_2$-$C_6$ fluoroolefins.

5. The polymer (A) according to claim 1 that is a VDF-CTFE-HEA-HFP tetrapolymer.

6. A process for manufacturing a fluoropolymer hybrid organic/inorganic composite comprising inorganic domains, said process comprising the following steps:
(i) providing a mixture of:
at least one polymer (A) according to claim 1; and
at least one compound (M) of formula (II):

$$X_{4-m}AY_m \qquad (II)$$

wherein m is an integer from 1 to 4, A is a metal selected from the group consisting of Si, Ti and Zr, Y is a hydrolysable group, X is a hydrocarbon group, optionally comprising one or more functional groups;
(ii) reacting at least a fraction of hydroxyl groups of the $R_x$ of monomer (MA) of polymer (A) with at least a fraction of compound (M), so as to obtain a grafted polymer comprising pendant —$Y_{m-1}AX_{4-m}$ groups, with m, Y, A and X having same meaning as above detailed;
(iii) hydrolyzing and/or polycondensing compound (M) and/or pendant —$Y_{m-1}AX_{4-m}$ groups, as above detailed to yield a fluoropolymer hybrid organic/inorganic composite comprising inorganic domains.

7. The process according to claim 6, wherein the mixture of step (i) comprises at least one organic solvent(S).

8. The process according to claim 7 wherein the at least one solvent(S) is a ketone.

9. A fluoropolymer hybrid organic/inorganic composite comprising inorganic domains obtained by the process according to claim 6.

10. Polymer electrolyte based on a fluoropolymer hybrid organic/inorganic composite comprising inorganic domains, said hybrid being obtained by a process comprising:
(I) providing a mixture of:
at least one a semi-crystalline vinylidene fluoride (VDF) copolymer [polymer (A)] comprising:
(a) recurring units derived from vinylidene fluoride (VDF);
(b) recurring units derived from chlorotrifluoroethylene (CTFE);
(c) recurring units derived from at least one hydrophilic (meth) acrylic monomer [monomer (MA)] of formula (I):

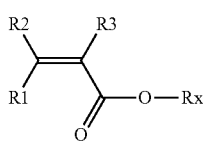

(I)

wherein each of R1, R2, R3, equal or different from each other, is independently an hydrogen atom or a $C_1$-$C_3$ hydrocarbon group, and $R_x$ is a $C_1$-$C_5$ hydrocarbon moiety optionally comprising at least one hydroxyl group; and
(d) recurring units derived from one or more fluorinated comonomers (F) different from VDF and from CTFE;
wherein the total amount of recurring units b) is comprised between 6% and 25% by weight with respect to the total weight of recurring units of polymer (A) and the total amount of recurring units d) is comprised between 0.5% and 4% by weight with respect to the total weight of recurring units of polymer (A), and wherein polymer (A) has a heat of fusion of at least 0.4 J/g, as measured according to ASTM D 3418;
at least one compound (M) of formula (II):

$$X_{4-m}AY_m \qquad (II)$$

wherein m is an integer from 1 to 4, A is a metal selected from the group consisting of Si, Ti and Zr, Y is a hydrolysable group, X is a hydrocarbon group, optionally comprising one or more functional groups; and
an electrolyte solution (ES) comprising at least one metal salt [metal salt (MS)] and a liquid medium [medium (L)];
(II) reacting at least a fraction of hydroxyl groups of the $R_x$ groups of said monomer (MA) of said polymer (A) with at least a fraction of said compound (M), so as to obtain a grafted polymer comprising pendant —$Y_{m-1}AX_{4-m}$ groups, with m, Y, A and X having same meaning as above detailed;
(III) hydrolyzing and/or polycondensing compound (M) and/or pendant —$Y_{m-1}AX_{4-m}$ groups, as above detailed to yield a polymer electrolyte based on a fluoropolymer hybrid organic/inorganic composite comprising inorganic domains incorporating the electrolyte solution (ES).

11. The polymer electrolyte according to claim 10 wherein the at least one metal salt (MS) is selected from the group consisting of: MeI, $Me(PF_6)_n$, $Me(BF_4)_n$, $Me(ClO_4)_n$, $Me(bis(oxalato)borate)_n$ ("$Me(BOB)_n$"), $MeCF_3SO_3$, $Me[N(CF_3SO_2)_2]_n$, $Me[N(C_2F_5SO_2)_2]_n$, $Me[N(CF_3SO_2)(R_FSO_2)]_n$ with $R_F$ being $C_2F_5$, $C_4F_9$, $CF_3OCF_2CF_2$, $Me(AsF_6)_n$, $Me[C(CF_3SO_2)_3]_n$, and $Me_2S_n$, wherein Me is a metal, and n is the valence of said metal.

12. The polymer electrolyte according 10 wherein the liquid medium (L) is selected from ionic liquids (IL), organic carbonates or mixture thereof.

13. A process for the manufacture of a polymer electrolyte membrane comprising processing the polymer electrolyte according to claim 10 through compression moulding or extrusion techniques.

14. A polymer electrolyte membrane obtained by the process of claim 13.

15. An electrochemical device comprising the polymer electrolyte according to claim 14.

16. The electrochemical device of claim 15 that is a metal-ion secondary battery.

17. The polymer electrolyte according to claim 11, wherein Me is a transition metal, an alkaline metal or an alkaline-earth metal.

18. The polymer electrolyte according to claim 11, wherein Me is Li, Na, K, or Cs.

19. The polymer electrolyte according to claim 11, wherein n is 1 or 2.

* * * * *